(12) United States Patent
Biernacki et al.

(10) Patent No.: US 6,362,759 B1
(45) Date of Patent: Mar. 26, 2002

(54) CONTROL CIRCUIT, AND SYSTEM USING SAME

(75) Inventors: Paul D. Biernacki, Alexandria; Paul J. Matthews, Springfield; Michael E. Gingerich, Dumfries, all of VA (US); Michael L. Frankel, Baltimore, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/606,098

(22) Filed: Jun. 26, 2000

(51) Int. Cl.[7] ................................. H03M 1/12
(52) U.S. Cl. ........................ 341/137; 341/155
(58) Field of Search ................. 341/137, 144, 341/155; 359/123, 181

(56) References Cited

U.S. PATENT DOCUMENTS

| | | |
|---|---|---|
| 5,699,177 A | 12/1997 | Yamamoto et al. ......... 359/125 |
| 5,706,301 A | 1/1998 | Lagerstrom ................ 372/32 |
| 5,729,511 A | 3/1998 | Schell et al. ............. 369/44.27 |
| 5,796,703 A | 8/1998 | Schell et al. .............. 369/116 |
| 5,999,299 A | 12/1999 | Chan et al. ............... 359/172 |
| 6,061,124 A | 5/2000 | Nyman et al. ............. 356/124 |
| 6,100,831 A | * 8/2000 | Frankel .................... 341/137 |

OTHER PUBLICATIONS

Paul D. Biernacki, Michael Y. Frankel, Michael E. Gingerich, Paul J. Matthews, A High Speed Mixed Digital to Analog Circuit Board for Accurate Control of Wavelength Tunable Lasers for Fiber–Optic Communications, IEEE Journal of Lightwave Technology, Jul. 1999, p 1222–1228 vol. 17, No. 7.

* cited by examiner

Primary Examiner—Brian Young
(74) Attorney, Agent, or Firm—John J. Katasek; Sally A. Ferrett

(57) ABSTRACT

A circuit for selectably generating a plurality of preselected digital output signals which are precise and accurate, and among which the circuit can switch rapidly. In one embodiment, the outputs are connected to analog circuit signals, and drive a optical laser such that choice of the particular outputs of the circuit permits controllable switching of the laser output wavelength.

25 Claims, 1 Drawing Sheet

CONTROL CIRCUIT, AND SYSTEM USING SAME

BACKGROUND

The increasing speed with which electro-optical devices can operate has created the need for correspondingly fast devices to control them. A notable example are wavelength tunable, single-mode, semiconductor lasers, which are key components in the rapidly expanding field of fiber optics, the applications of which include wavelength division multiplexing based communication systems, measurement applications, sensor applications, and sophisticated optically controlled microwave systems. An intense effort has been devoted to optimizing and manufacturing such tunable lasers, but the predictability and performance of such lasers, as well as that of the circuit drivers needed for them, have not been explored carefully. An important example of such a laser is the tunable super structure grating distributed Bragg reflector laser, whose tremendous speed in switching from one output wavelength to another offers the scope for applications which the optics community is only beginning to explore. However, to operate a super structure grating distributed Bragg reflector laser, one needs external circuitry to separately generate four control currents, the so-called front and back currents which control the effective cavity size of the laser, a phase section to control the phase of the laser's optical field, and the laser's gain current, which turns the laser on and controls its output power. To exploit the promise of this laser, one needs circuitry that can generate these currents with speed comparable to the laser itself, circuitry that can generate these currents accurately to ensure precise wavelength control, and circuitry that is re-programable, to permit updating circuit information as the operating parameters of the laser vary over time.

SUMMARY OF THE INVENTION

Accordingly, it is an object of the invention to provide a circuit which can output highly accurate and precise signals.

Another object is to provide a circuit which is very fast, and thus can controllably switch between preselected outputs rapidly.

Another object is to provide such a circuit whose output parameters are continuously updatable.

Another object is to provide a laser system whose output wavelength is controlled by such a fast, accurate, and reprogrammable control circuit.

In accordance with these and other objects made apparent hereinafter, the invention concerns a signal generator, having a data input, and a buffer which has a digital storage device which can store a plurality of digital words in a corresponding plurality of storage addresses. The data input and the buffer are co-operatively disposed to permit the data input to selectably address one or more of the plurality of storage addresses so as to cause the buffer to output one or more selected digital words.

Because the circuit is digital, its output, unlike that of an analog circuit, has fixed values, and hence is inherently more immune to noise. Furthermore, its accuracy is an arbitrary choice determined by the bit resolution one selects. Being digital, the outputs of the circuit are updatable simply by reading new values into the digital storage device, e.g. new settings corresponding to the drive currents for a laser whose operating parameters have drifted over time. Finally, being digital, the response of such a circuit can be extremely fast, and, moreover, computer controllable.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawing, wherein:

DETAILED DESCRIPTION

Figure 1:
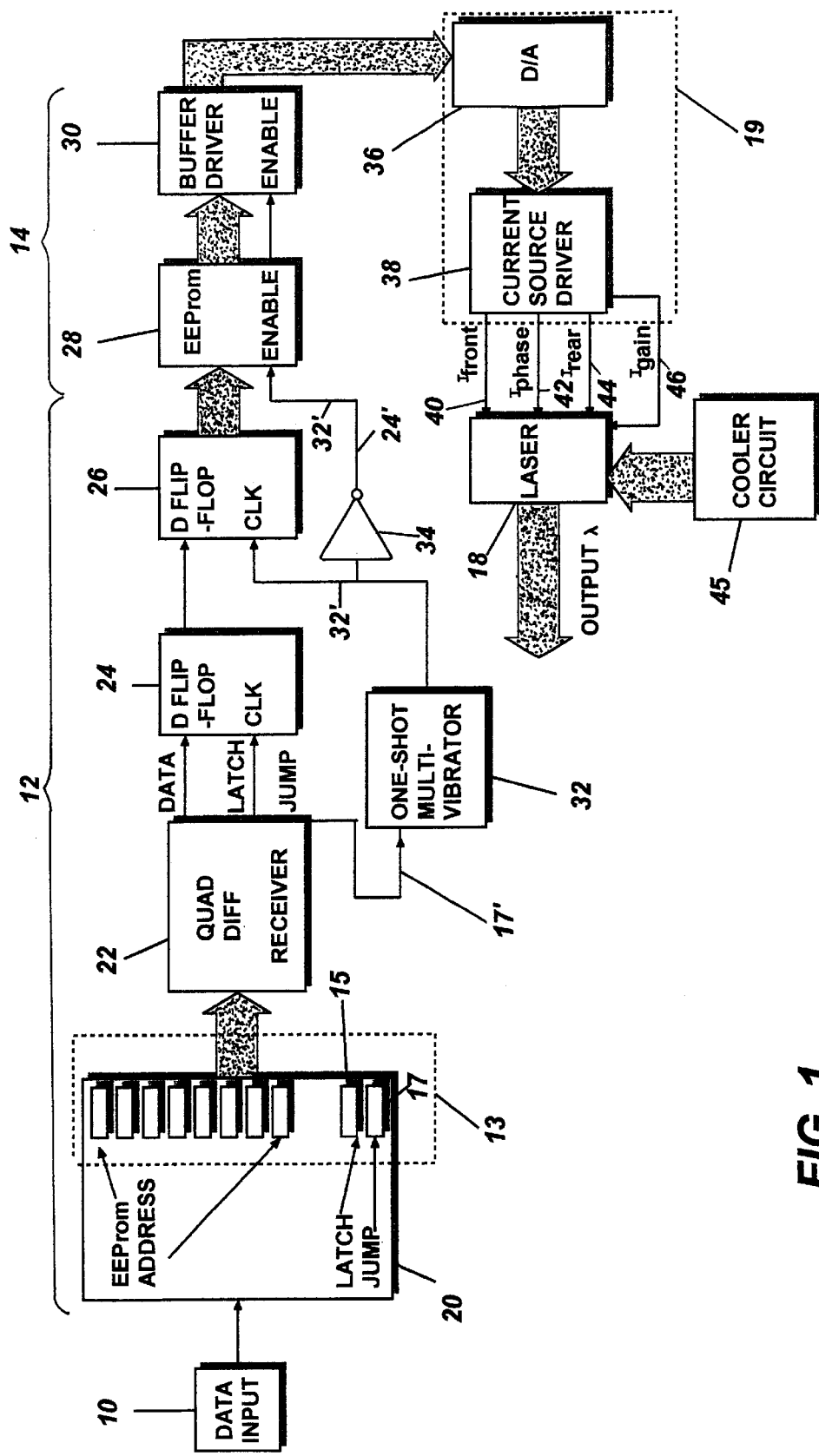
FIG. 1 is a circuit diagram of a system according to the invention.

FIG. 1 shows a circuit device according to the invention, in which data input 10, data converter and conditioner 12 (hereafter, data converter), buffer 14, and digital to analog current driver 19, ultimately produce control currents which tune the output wavelength of laser 18. EEProm 28 in buffer 14 contains a plurality of digital addresses, in which are stored a plurality of digital values, each value corresponding to the magnitude of a control signal for output to laser 18. Data converter 10, for example a process computer or manual control panel, is disposed to forward a digital word 13 to data input device 20. Two bits of digital word 13 are called respectively a latch bit 15 and a jump bit 17, for reasons discussed below. The remaining bits of digital word 13 contain information (hereafter called the "address data" of word 13) coded to identify an address in EEProm 28 in which resides a desired control signal for laser 18. Upon receipt of digital word 13 from data input 10, device 20 passes word 13 to differential receiver 22. Word 13 is coded with an address in EEProm 28, a latch bit, and a jump bit.

Receiver 22 is preferably an interface which coverts input from data input 10 from differential logic to TTL, or other conventional, logic, or other which permits use of particularly fast digital devices based on TTL. Members 10 and 20 preferably use differential logic, which is more resistant to noise, permitting members 10 and 20 to be remotely located from generator 12 and buffer 14, and still minimize the amount of noise to which the circuit is exposed. Upon data input 20 forwarding latch bit 15 to differential receiver 22 forwards the address data of word 13 to flop-flop 24, and, thereafter, upon receiving jump bit 17, forwards an enabling pulse to one-shot multivibrator 32, causing it to generate a responsive clock pulse 17'.

Flip flop 26 is disposed to receive the address data of digital word 13 from flip flop 24 and pass the address data in word 13 to EEProm 28, both EEProm 28 and flip-flop 26 being clocked along line 32' by one-shot multivibrator 32. Enablement of EEProm 28 causes EEProm 28 to receive the address data of word 13 from flip flop 26, and to make available to buffer driver 30 the digital signal stored in EEProm 28 at the address corresponding to the address data of digital word 13. Multivibrator 32, responsive to enablement of jump pulse 17', drives inverter 34 which in turn sends a disable signal to driver 30. Because of inverter 34, driver 30 is disabled when jump bit 17 is enabled, and re-enabled when jump bit 17 reverses.

The digital portion of the circuit of FIG. 1, members 12 and 14 (or, depending on one's particular application, members 20 or 10 also), are preferably placed closely packed on one circuit board, with a common ground plane isolated from the non-digital portion of the circuit, namely member 38, 18, etc., to increase circuit reliability and increase circuit speed by minimizing the distances over which its signals must travel.

In operation, member 10 sends word 13 to device 20, which automatically forwards the address data of word 13 to differential receiver 22, along with by latch bit 15 and then jump bit 17. If the value of latch 15 is enabling, the address data of word 13 is forwarded after a short delay to flip flop 24. Similarly, if the value of jump bit 17 is enabling, differential receiver 22 strobes one-shot multivibrator 32, which clocks the address data from flip flop 24 to flip flop 26 and enables EEProm 28. Upon enablement, EEProm 28 receives word 13 from flip flop 26, locates the digital control signal at the address corresponding to the address data in digital word 13, and makes the control signal available to driver 30. Simultaneously, multivibrator 32 and inverter 34 disable driver 30, until multivibrator 32's one-shot pulse has finished, whereupon driver 30 becomes enabled and receives the control signal from EEProm 28, and forwards the signal to digital to analog converter 36, and ultimately to laser 18. By maintaining driver 30 disabled for a short time, the output to digital to analog converter 18 is nulled for a short time, and thus the control signal to laser 18 is nulled also. This is advantageous to prevent hysterisis effects in laser 18 from causing a corresponding hysterisis in laser 18's wavelength as members 12 and 14 switch laser 18 from one output mode to another.

Digital to analog converter 36 converts the digital output of driver 30 into analog form, which in turn controls current driver 38, producing a control current for laser 18. Converter 36 is typically a voltage source, and current source driver 38 converts the voltage output of converter 19 to a current signal. Laser 18 requires three such current signals plus a current driver for the gain section, as illustrated by lines 40, 42, 44 and 46. In practice, each of these signals would be produced by three separate circuits of the kind shown in FIG. 1 as comprising members 12, 14, 36, 38. Preferably, however, there would only be one digital word 13, whose address data would be interpretable by each of the three circuits to data input launching of the correct digital output signal from each. This means that in practice there would be one member 10 and one member 20, which would forward digital word 13 in parallel to each of the three circuits. Laser 18 also may have a conventional cooling circuit 45 to stabilize laser 18 and minimize wavelength drift.

Because the circuit of FIG. 1 employs digital components, particularly those based on TTL logic, and is placed on one circuit board with the digital components closely packed, the circuit is inherently very fast, and thus can switch control signals to laser 18 very quickly. Because the output of buffer 14 is a digital signal, rather than an analog signal, current output is inherently very stable, making the signals in member 36, 38, etc. similarly stable. This permits one to dispense with complicated and inherently slow phase locked loops which may be used to keep a corresponding analog control system within tolerances. One could, for example, use for driver 38 a straightforward operational amplifier driving a high current capacity transistor, a textbook scheme which is both inexpensive and inherently quick.

The precision of the output from member 19 is limited only by the number of bits employed in EEProm 28, and hence can be made as precise as one's application demands within currently available technology. Because address 13 is clocked sequentially across generator 12 and buffer 14, interstage noise such as one would associate with an analog system is minimized. Such noise as is present, most notably ringing as circuit components are switched, is further minimizable by making the response time of downstream components in the circuit longer than the ringing time of upstream components, by proper grounding of the circuit, and by proper isolation of the digital portion of the circuit of FIG. 1, from the analog portion. In this manner, the circuit of FIG. 1 provides an output signal that is precise, fast, and robust against noise. Furthermore, because the output signals are stored as digital words in EEProm 38, one can readily recalibrate the system as laser 18's operating parameters change by simply reading new values into EEProm 28. These new values would typically come from calibration trials on laser 18, in which one tests the laser to determine which sets of drive currents produce which laser modes. Having done this, one simply digitizes the critical values of drive current and reads them into EEProm 28.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

What is claimed is:

1. A signal generator, comprising:
   a data input, and
   a buffer, said buffer comprising a digital storage device, said device being effective to store a preselected plurality of digital words in a corresponding plurality of storage addresses; and
   wherein said data input and said buffer are co-operatively disposed to permit said data input to selectively address one or more of said plurality of storage addresses effective to cause said buffer to output the one or more of said plurality of digital words in said one or more of said plurality of storage addresses.

2. The signal generator of claim 1, further comprising a digital to analog converter disposed to convert said one or more of said plurality of digital words into a corresponding one or more analog outputs.

3. The signal generator of claim 2, wherein said digital to analog converter outputs said one or more analog outputs as one or more voltage outputs, and wherein said system further comprises a current source disposed to output, responsive to said digital to analog converter, to output a corresponding one or more current outputs.

4. The signal generator of claim 2, wherein said buffer, responsive to said data input selectively addressing said one or more of said plurality of storage addresses, is adapted to cause output from said buffer to be zero for a preselected time prior to outputting said one or more of said plurality of digital words.

5. The signal generator of claim 2, wherein said buffer and said digital to analog converter are operatively disposed on one circuit board.

6. The signal generator of claim 2, wherein said buffer comprises a buffer driver, said buffer driver and said digital storage device being clocked by inverter versions of the same clock signal such that presence of said clock signal is effective to cause said digital storage device to transfer said one or more of said plurality of digital words to said buffer driver, and removal of said clock signal is effective to cause said buffer driver to output said one or more of said plurality of digital words from said buffer.

7. The signal generator of claim 6, further comprising a data conditioner and converter, said conditioner and converter comprising:
   a data input device;
   a digital receiver;
   a first flip flop;
   a second flip flop; and a one-shot multivibrator;

wherein said data input is adapted to send to said data input device a digital word, one bit of said word being a jump bit, one bit being a latch bit, and the remaining bits being information coded to correspond to said one or more of said plurality of storage addresses;

wherein said data input device is adapted to forward said remaining bits to said differential receiver staggered in time with respect to one another, said remaining bits first, said latch bit thereafter, and finally said jump bit;

wherein said differential receiver is adapted to:
 a. convert said digital word into TTL logic, and, responsive to receipt of said latch bit, forward said remaining bits to said first flip flop; and
 b. to forward said jump bit in the form of a jump pulse to said multivibrator;

wherein said multivibrator is disposed, responsive to receipt of said jump pulse, to
 a. clock said remaining bits from said first flip flop to said second flip flop; and
 b. clock said remaining bits from said second flip flop to said digital storage device;
 c. disable the output of said buffer driver;

wherein said digital storage device is adapted to correspond said remaining bits to said one or more of said plurality of storage areas effective to output said one or more plurality of digital words in said one or more storage areas to said buffer driver;

wherein said buffer driver, responsive to the absence of said jump pulse from said multivibrator, is enabled to output said one or more of said plurality of digital words.

8. The signal generator of claim 7, wherein said buffer and said digital to analog converter are operatively disposed on one circuit board.

9. A control system, comprising:
a signal generator and a device to be driven, said signal generator comprising:
 a data input, and
 a buffer, said buffer comprising a digital storage device, said device being effective to store a preselected plurality of digital words in a corresponding plurality of storage addresses;
 wherein said data input and said buffer are co-operatively disposed to permit said data input to selectively address one or more of said plurality of storage addresses effective to cause said buffer to output the one or more of said plurality of digital words in said one or more of said plurality of storage addresses;
 wherein said signal generator and said device are co-operatively disposed such that said one or more of said plurality of digital words is input to said device.

10. The system of claim 9, further comprising a digital to analog converter disposed to convert said one or more of said plurality of digital words into a corresponding one or more analog outputs.

11. The system of claim 10, wherein said digital to analog converter outputs said one or more analog outputs as one or more voltage outputs, and wherein said system further comprises a current source disposed to output, responsive to said digital to analog converter, to output a corresponding one or more current outputs.

12. The system of claim 10, wherein said buffer, responsive to said data input selectively addressing said one or more of said plurality of storage addresses, is adapted to cause output from said buffer to be zero for a preselected time prior to outputting said one or more of said plurality of digital words.

13. The system of claim 10, wherein said buffer and said digital to analog converter are operatively disposed on one circuit board.

14. The system of claim 10, wherein said buffer comprises a buffer driver, said buffer driver and said digital storage device being clocked by inverter versions of the same clock signal such that presence of said clock signal is effective to cause said digital storage device to transfer said one or more of said plurality of digital words to said buffer driver, and removal of said clock signal is effective to cause said buffer driver to output said one or more of said plurality of digital words from said buffer.

15. The system of claim 14, further comprising a data conditioner and converter, said conditioner and converter comprising:

a data input device;

a digital receiver;

a first flip flop;

a second flip flop; and a one-shot multivibrator;

wherein said data input is adapted to send to said data input device a digital word, one bit of said word being a jump bit, one bit being a latch bit, and the remaining bits being information coded to correspond to said one or more of said plurality of storage addresses;

wherein said data input device is adapted to forward said remaining bits to said differential receiver staggered in time with respect to one another, said remaining bits first, said latch bit thereafter, and finally said jump bit;

wherein said differential receiver is adapted to:
 a. convert said digital word into TTL logic, and, responsive to receipt of said latch bit, forward said remaining bits to said first flip flop; and
 b. to forward said ump bit in the form of a jump pulse to said multivibrator;

wherein said multivibrator is disposed, responsive to receipt of said jump pulse, to
 a. clock said remaining bits from said first flip flop to said second flip flop; and
 b. clock said remaining bits from said second flip flop to said digital storage device;
 c. disable the output of said buffer driver;

wherein said digital storage device is adapted to correspond said remaining bits to said one or more of said plurality of storage areas effective to output said one or more plurality of digital words in said one or more storage areas to said buffer driver;

wherein said buffer driver, responsive to the absence of said jump pulse from said multivibrator, is enabled to output said one or more of said plurality of digital words.

16. The system of claim 15, wherein said buffer and said digital to analog converter are operatively disposed on one circuit board.

17. The system of claim 9, wherein said device is a laser, and said input is effective to control the wavelength at which the laser emits.

18. The system of claim 17, wherein said laser is a superstructure grating distributed Bragg reflector laser, and said one or more analog outputs is at least four analog outputs said at least four analog outputs being, respectively, the front control current of said laser, the rear control current of said laser, the phase section current, and the gain section current of said laser.

19. The system of claim 18, further comprising a digital to analog converter disposed to convert said one or more of said plurality of digital words into a corresponding one or more analog outputs.

20. The system of claim 19, wherein said digital to analog converter outputs said one or more analog outputs as one or more voltage outputs, and wherein said system further comprises a current source disposed to output, responsive to said digital to analog converter, to output a corresponding one or more current outputs.

21. The system of claim 19, wherein said buffer, responsive to said data input selectively addressing said one or more of said plurality of storage addresses, is adapted to cause output from said buffer to be zero for a preselected time prior to outputting said one or more of said plurality of digital words.

22. The system of claim 19, wherein said buffer and said digital to analog converter are operatively disposed on one circuit board.

23. The system of claim 19, wherein said buffer comprises a buffer driver, said buffer driver and said digital storage device being clocked by inverter versions of the same clock signal such that presence of said clock signal is effective to cause said digital storage device to transfer said one or more of said plurality of digital words to said buffer driver, and removal of said clock signal is effective to cause said buffer driver to output said one or more of said plurality of digital words from said buffer.

24. The system of claim 23, further comprising a data conditioner and converter, said conditioner and converter comprising:

a data input device;

a digital receiver;

a first flip flop;

a second flip flop; and a one-shot multivibrator;

wherein said data input is adapted to send to said data input device a digital word, one bit of said word being a jump bit, one bit being a latch bit, and the remaining bits being information coded to correspond to said one or more of said plurality of storage addresses;

wherein said data input device is adapted to forward said remaining bits to said differential receiver staggered in time with respect to one another, said remaining bits first, said latch bit thereafter, and finally said jump bit;

wherein said differential receiver is adapted to:
  a. convert said digital word into TTL logic, and, responsive to receipt of said latch bit, forward said remaining bits to said first flip flop; and
  b. to forward said jump bit in the form of a jump pulse to said multivibrator;

wherein said multivibrator is disposed, responsive to receipt of said jump pulse, to
  a. clock said remaining bits from said first flip flop to said second flip flop; and
  b. clock said remaining bits from said second flip flop to said digital storage device;
  c. disable the output of said buffer driver;

wherein said digital storage device is adapted to correspond said remaining bits to said one or more of said plurality of storage areas effective to output said one or more plurality of digital words in said one or more storage areas to said buffer driver;

wherein said buffer driver, responsive to the absence of said jump pulse from said multivibrator, is enabled to output said one or more of said plurality of digital words.

25. The system of claim 24, wherein said buffer and said digital to analog converter are operatively disposed on one circuit board.

* * * * *